United States Patent [19]

Hühne

[11] 4,339,984

[45] Jul. 20, 1982

[54] DRIVE, PARTICULARLY FOR AN INDUSTRIAL MANIPULATOR

[75] Inventor: Gerd Hühne, Mörsch, Fed. Rep. of Germany

[73] Assignee: G. H. Pfaff Pietzsch Industrieroboter, Fed. Rep. of Germany

[21] Appl. No.: 90,097

[22] Filed: Nov. 1, 1979

Related U.S. Application Data

[63] Continuation of Ser. No. 812,773, Jul. 5, 1977, abandoned, which is a continuation of Ser. No. 469,757, May 14, 1974, abandoned.

[30] Foreign Application Priority Data

May 29, 1973 [DE] Fed. Rep. of Germany ....... 2327387

[51] Int. Cl.$^3$ ............................................. F15B 15/26
[52] U.S. Cl. .......................................... 91/42; 91/43; 192/146
[58] Field of Search ................. 91/44, 41, 42, 43, 35, 91/55, 61; 60/442, 407, DIG. 2; 112/274; 192/146, 143, 147; 188/161, 163, 110, 162; 318/603, 614; 417/363; 92/23, 27, 28

[56] References Cited

U.S. PATENT DOCUMENTS

| | | | |
|---|---|---|---|
| 2,766,651 | 10/1956 | Forward | 192/143 |
| 3,176,590 | 4/1965 | Uhtenwoldt | 91/44 |
| 3,361,034 | 1/1968 | Rothrock | 91/43 |
| 3,425,373 | 2/1969 | Miller | 112/276 |
| 3,587,798 | 6/1971 | Schuman | 188/161 |
| 3,613,505 | 10/1971 | Bubula | 91/35 |
| 3,633,718 | 1/1972 | Wanner | 192/146 |
| 3,668,973 | 6/1972 | Kado | 60/442 |
| 3,979,999 | 9/1976 | Emenaker | 91/44 |

Primary Examiner—Abraham Hershkovitz
Attorney, Agent, or Firm—McGlew and Tuttle

[57] ABSTRACT

The drive comprises an air-operated driving unit imparting either a linear or a rotary motion to the working member of a manipulator and, at the same time, driving the rotor of an electromagnetic brake in accordance with displacement of the working member. For linear movement of the working member, the driving unit comprises an air-operated piston-cylinder actuator and, for rotary movement of the working member, comprises a vane-type air motor. An electronic control system controls the operation of the driving unit and of the electromagnetic brake, and thus the motion of the working member. The control system provides both a selective and a continuous control of the positioning operation by continuously comparing the actual and desired positions of the working member and, when the working member reaches a point in advance of its desired final position, the movement of the working member is continuously decelerated by actuating the electromagnetic brake in a controlled manner so that the deceleration follows a predetermined course. When the speed of the working member has been decelerated to a minor fraction of its initial speed, in the immediate vicinity of the desired final position, the brake is applied fully and instantaneously. Preferably, the brake is a multiple-disc brake. The control system comprises a displacement pick-up as the measuring means for the actual displacement and a proportional controller as the controlling means. The air-operated piston-cylinder is operatively connected to the brake by means of a rack and pinion gear arrangement, and the vane motor is connected directly to the rotor of the brake and to the working member through a wobble gearing.

19 Claims, 6 Drawing Figures

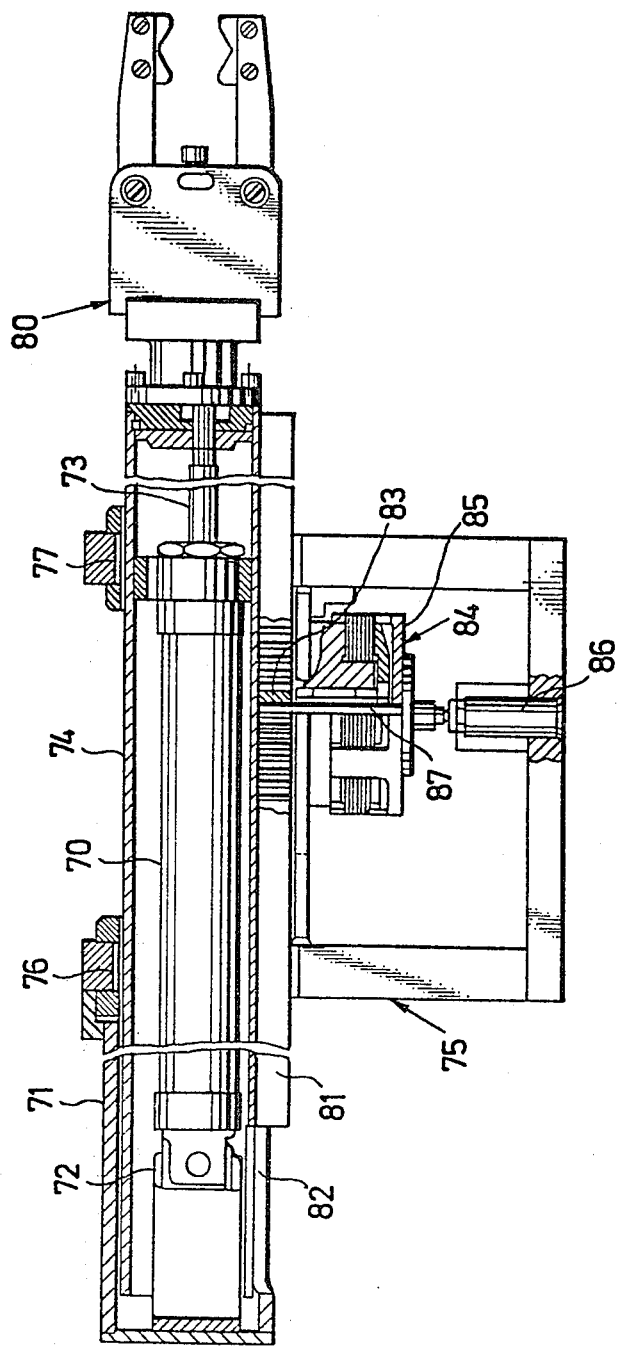

DRIVE, PARTICULARLY FOR AN INDUSTRIAL MANIPULATOR

This is a continuation of application Ser. No. 812,773 filed July 5, 1977, abandoned, which is a continuation of Ser. No. 469,757, filed May 14, 1974, abandoned.

FIELD AND BACKGROUND OF THE INVENTION

This invention relates to precision drives for industrial manipulators and, more particularly, to a new and useful pneumatic or air pressure drive by means of which an exact positioning of a mechanical member of the manipulator, having to perform either a translatory or rotary motion before reaching its final position, can be obtained.

At the present time, in cases where an accurate positioning of the working member of a mechanism and a sensitive control of the velocity of its motion toward the desired position is wanted, electric, hydraulic, or pneumatic drives are used. Such drives are needed in many different applications such as, for example, in industrial sewing machines. One of the most important applications of these drives, however, is in manipulators, particularly industrial manipulators. Such manipulators comprise members having to perform a rotary or linear translatory motion before coming to their position, the number of members corresponding to the number of degrees of freedom. Each member may be provided with its own separate drive.

In manipulators, the velocity and, in particular, the final positioning of the respective working member must be controlled in an exactly defined manner. Frequently, it is also necessary to control the whole movement of the working member along a path leading to the final position.

In view of their excellent properties and for economic reasons, pneumatic drives would be particularly suitable for use in manipulators and also for other applications, provided they could permit an accurate and simple positioning. However, conventional pneumatic drives use mechanical stops for the positioning and do not permit any programming or re-programming through a central control or a computer. Up to date, pneumatic drives are "programmed" with a monkey wrench. That is why, in an operational cycle, only the operative range between the stops, and not the range outside the stops, can be used. This is a considerable drawback.

Attempts have been made to control pneumatic or compressed air drives. In such cases, however, certain physical limits are reached very soon. Namely, the compressibility of air does not permit a free positioning without relation to the load, and the control of an air cylinder is very difficult because of the high time constant of the cylinder spaces acting as accumulators during the charging and discharging operation.

The present invention is directed to eliminating the mentioned disadvantages of a pneumatic drive and to make it suitable for precision positioning.

SUMMARY OF THE INVENTION

In accordance with the present invention, there is provided a simple and economic drive, particularly for manipulators, permitting an exact control of the displacement of a working member in any operational range. The present invention provides that position and velocity of the working member, moved by a pneumatic drive, are adjusted or controlled by means of an electromagnetic brake which, in turn, is controlled by signals produced in a control system controlling, at the same time, the driving unit and the working member.

In using compressed air for the operation, the advantages of a pneumatic drive, such as simple construction and supply of energy without problems of security or economy, can be fully utilized. A control by means of an electromagnetic brake permits an accurate positioning independent of the load. Due to the control by electric signals, the position and velocity can be selected easily, without adjustments in the drive itself, for example, by pushing a button on the central control unit. There are no mechanical stops. The velocity can be varied in the desired manner by controlling the energization of the electromagnetic brake.

Particularly for manipulators with point-to-point and multipoint controls, i.e. controls permitting to adjust in advance one or more positions to be occupied by the working member of the manipulator, the inventive drive concept offers clear advantages. A cost comparison with a corresponding controllable hydraulic drive shows a ratio of 3:1 in favor of the pneumatic drive. Also, the expenses of mounting, maintenance and repair are smaller.

For the control of the electromagnetic brake, a particularly suitable control concept is one in which the braking torque of the electromagnetic brake is controlled in a quasi-continuous cut-off manner where, initially, the velocity is continuously controlled as a function of the position difference or error signal value and after a creep velocity, or a minimum off-position relative to the first position is reached, which is predeterminable in the control system, the electromagnetic brake is fully energized in a control-free manner.

In this case, the actual position is advantageously determined by means of a pick-up and compared with the desired position, the difference between the actual and desired value, i.e. the position difference or error signal value, is produced, the drive velocity is measured, the position difference and velocity are transmitted to a comparison means, and the obtained comparative value is fed into a controller furnishing an output signal for actuating the electromagnetic brake. Advantageously, the pick-up is an incremental displacement pick-up from the output signal of which both the actual position and the velocity may be derived, both values advantageously in the form of voltages. A tacho-generator may also be used as the pick-up of the actual position and velocity.

The drive concept in accordance with the invention can be applied both to rotary and translatory motions of the working member. A preferred embodiment for a rotary motion comprises a vane-type air motor known per se, i.e. a motor including an eccentric rotor and vanes radially displaceable therein, the motor being located within the deformable part of a wobble gearing. This combination of units, which are known in themselves and therefore proved and reliable, results in a particularly compact arrangement permitting a onestep reduction of up to 300:1.

An embodiment for translatory motion may comprise, for example, an air cylinder including a reciprocating piston with a piston rod to which the electromagnetic brake is connected by a coupling. The coupling may comprise a toothed rack connected to a piston rod and a pinion cooperating therewith and driving the rotor of the electromagnetic brake.

An object of the invention is to provide a drive, in particular for an industrial manipulator, comprising a pneumatically operated driving unit for imparting a rotary or translatory motion to a working member of the manipulator to displace the member toward its desired operational position, an electromagnetic brake operatively connected to the driving unit and adapted to brake the motion of the member along a predetermined path before reaching the desired operational position of the member and to stop it in this position, and a control system including measuring, comparison, and controlling means permitting a selective as well as continuous control of the operation of the driving unit and the electromagnetic brake.

Another object of the invention is, for imparting a translatory motion to the working member, to provide the driving unit in the form of an air-operated piston-cylinder linear actuator having its piston rod connected directly to the working member and, by means of a rack-and-pinion gear, to the rotor of the electromagnetic brake.

A further object of the invention is, for imparting a rotary motion to the working member, to provide the driving unit in the form of a vane-type air motor whose output shaft carries the rotor of the electromagnetic brake while the working member is fixed to the outer part of a wobble gearing surrounding the van motor.

Another object of the invention is to provide a control system for controlling the operation of the driving unit and the brake, comprising measuring means, preferably in the form of a displacement pick-up, comparison means for comparing the actual and desired values, and controller means, preferably a proportional controller, for controlling the actuation of the electromagnetic brake and the driving unit.

A further object of the invention is to provide such a drive which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the Drawings:

FIG. 6 in an elevation view partly in section, of a translatory drive embodying the invention and including an air-operated piston-cylinder linear actuator and an electromagnetic brake which is shown partly in elevation.

DETAILED DESCRIPTION OF THE PREFERRED EMBODIMENTS

Figure 1:
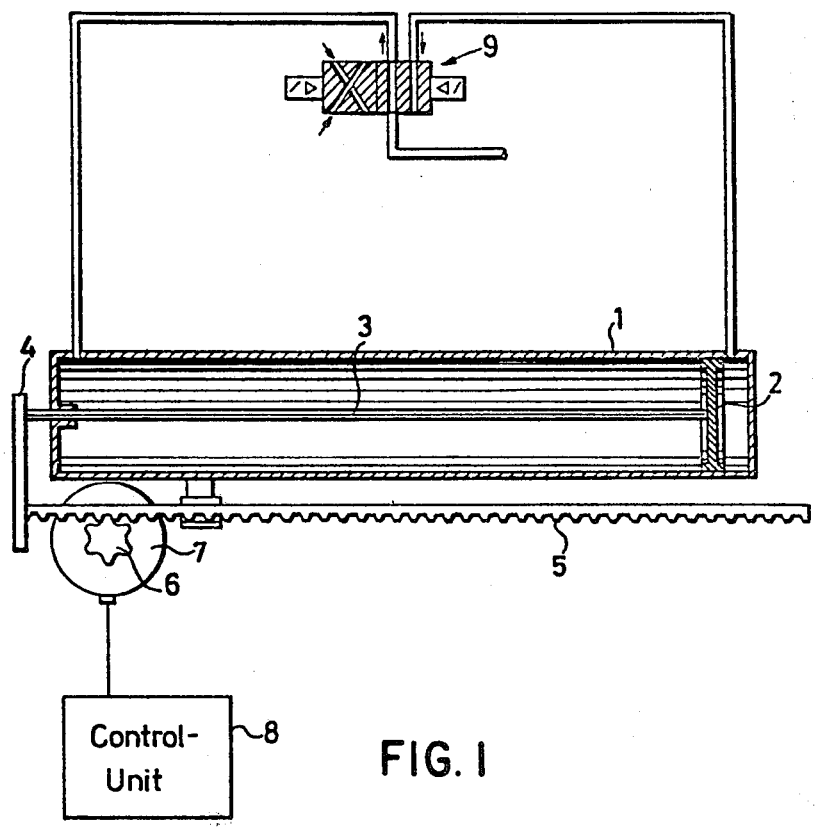
FIG. 1 is a diagrammatic illustration of a translatory drive embodying the invention.

Referring first to FIG. 1, the embodiment of a translatory drive, in accordance with the invention, diagrammatically illustrated therein includes an air cylinder 1 with a double-acting piston 2 displaceable therein and a piston rod 3. Piston rod 3 is rigidly connected to a toothed rack 5 by means of a cross-beam 4, also intended as a support for the non-represented working member of the manipulator. The assembly comprising rack 5 and the piston rod 3 is guided by a bushing provided in the end of cylinder 1 for the rod 3 and, outside the cylinder, by a guide 6' for the rack 5. Rack 5 meshes with a pinion 6 which is mounted on a common shaft with the rotor of an electromagnetic brake 7. Electromagnetic brake 7 is controllable by means of an electronic control unit 8 represented in FIG. 1 as a box. The position of the movable part of the drive is measured by means of an incremental displacement pick-up which is also mounted on the shaft carrying pinion 6 and the rotary electromagnetic brake 7.

Compressed air is supplied to and evacuated from double-acting air cylinder 1 through a solenoid valve arrangement generally designated 9 and controlled independently of electromagnetic brake 7.

Figure 2:
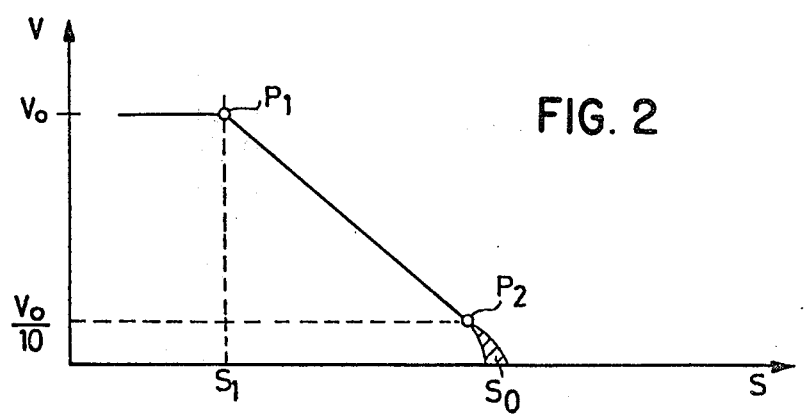
FIG. 2 is a diagram graphically illustrating the variation of the velocity as a function of the stroke of an air-operated piston-cylinder linear actuator, with a cut-off control of the drive, in accordance with the invention.

In the following, the operation of the drive according to FIG. 1 is described with reference to FIG. 2.

If a position in control unit 8 is to be reached by the working member of a manipulator, valve arrangement 9 receives a control signal from the control unit 8, and piston 2, piston rode 3, and rack 5 are conjointly displaced. At the beginning and during the first phase of the movement, electromagnetic brake 7 is entirely disengaged or deenergized and the motion is effected at the maximum speed, for example of one m/sec. At a certain distance from the desired final position, which can also be preselected in control unit 8, brake 7 is energized or engaged in a controlled manner. In FIG. 2, the velocity v is plotted against the stroke s of the piston rod-rack assembly. On the v-axis, the maximum displacement velocity is designated $v_o$. At a preselectable stroke $s-s_1$, i.e. at the point $P_1$ of FIG. 2, electromagnetic brake 7 is actuated or energized in a controlled continuous manner. At this time, the air-operated linear actuator 1-2-3 still acts in the forward direction. Over the distance covered at a continuously controlled speed, the actuator performs a work which is converted into friction force within the brake. Thus, as shown in FIG. 2, the velocity decreases linearly with the continuing slop until, at the point $P_2$, the so-called creep velocity, in the present example $v_o/10$, is reached. At this point $P_2$, the brake is fully energized or actuated instantaneously, in a discontinuous manner. However, the drive continues to be effective through a certain displacement difference $s_o$. This displacement difference is caused by the cut-off delay, by the scattering of the braking torque due to variable friction conditions, and by scattering of the load. Nevertheless since, in accordance with the provided quasicontinuous cut-off control including first a controlled application of the brake and then an instantaneous full engagement, the discontinuous cutting off starts only at a very low speed, the mentioned displacement difference $s_o$ is very small and can be made even smaller than an increment, i.e. the smallest measured distance variation, so that a positioning is made possible within relatively narrow tolerances, for example of ±1 mm, as has been found in practice.

Figure 3:
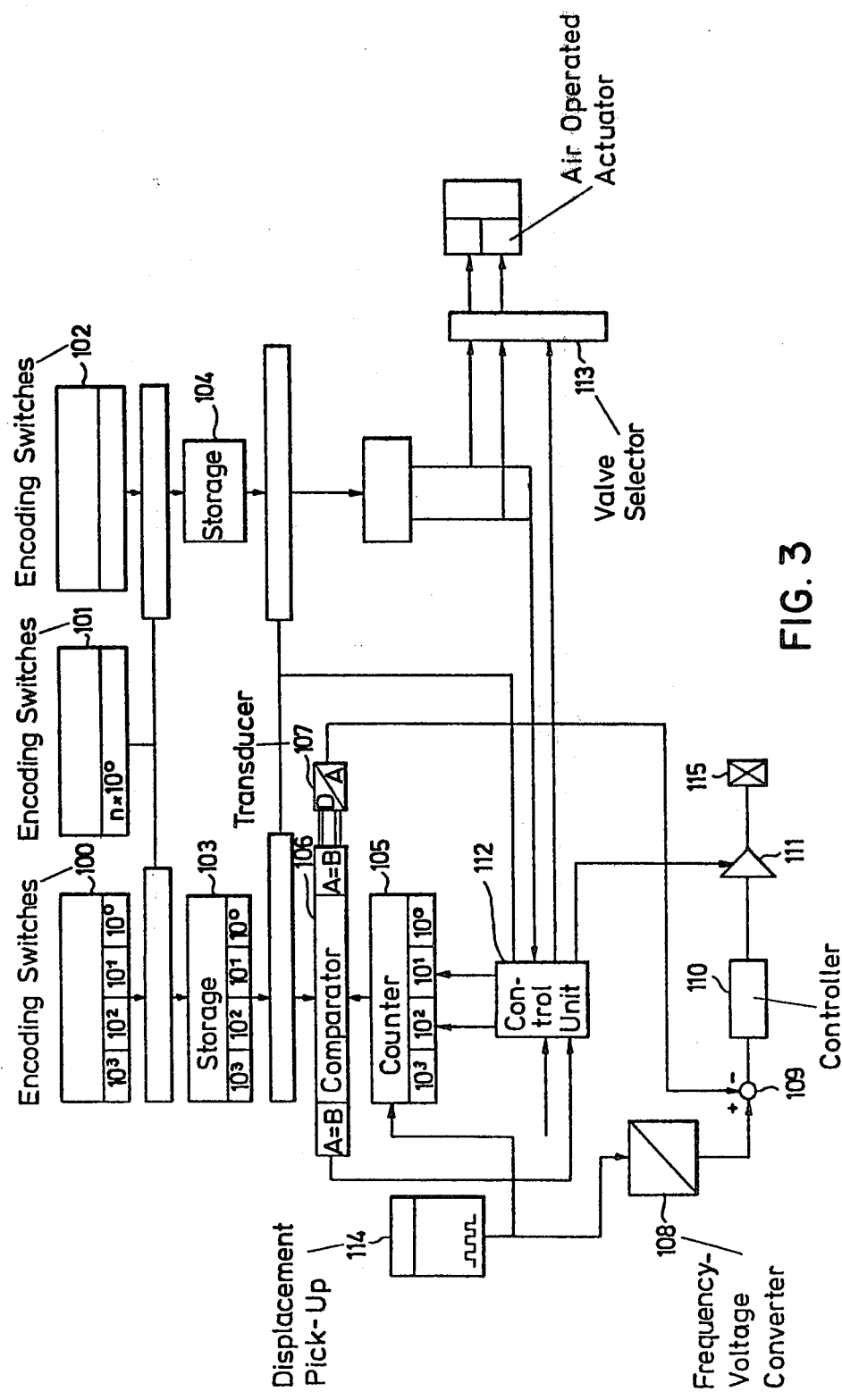
FIG. 3 is a block diagram of a control system, including a controller for controlling an electromagnetic brake, associated with the drive, in accordance with the invention.

An example of a basic concept of an electronic control system corresponding to the control unit 8 indicated in FIG. 1 is shown in FIG. 3. In considering this control system, a distinction must be made between a differential input and an integral input. With a differential input, which can be effected with the control system shown in FIG. 3, direction of motion, step number, and numerical value of the position and, if the same control circuitry is used for controlling a plurality of drives, also the degree of freedom, can be consecutively adjusted in the encoding switch groups 100, 101 and 102 and read in into the individual storages 103, 104. Each information on the position can be selected through the degree of freedom and step number, checked and, if necessary, readjusted.

A control operation is started in the control unit designated 119 which controls, inter alia, both the inlet and outlet valves of the air-operated driving unit by furnishing control pulses or a continuous signal to a valve-selection device 113, and the electromagnetic brake 115 during full application of the latter. The actual positions, determined by an incremental displacement pick-up 114, are transmitted, by way of counting the linear or angular increments, into a forward and reverse counter 105 counting the increments independently of the direction. By comparing the desired and actual positions in a comparator 106, the position difference signal value, corresponding to the remaining distance to be covered by the working member to reach the desired position, is determined and converted into a voltage by means of a transducer 107.

Further, by means of a frequency-voltage converter 108, the output value transmitted by incremental displacement pick-up 114 is converted into a voltage which is proportional to the drive velocity. Both voltages are supplied to a comparator 109 and the comparative value formed thereby is transmitted to a controller 110 of the electromagnetic brake 115. Advantageously, controller 110 is designed as a proportional controller so that, at the cut-off operation, its output signal results in a decrease of velocity of the working member motion which decrease is proportional to the position difference signal value.

The position difference signal value at which the electromagnetic brake has to be energized or actuated in a controlled manner (point $P_1$ in FIG. 2) is determined as a function of the parameters maximum braking acceleration, time constant of the electromagnetic brake, mass of the moving parts of the drive, and load. Point $P_2$ (see FIG. 2) is advantageously reached at a velocity which is equal to 5-10% of the maximum displacement velocity. As described above, upon attainment of this greatly reduced velocity, the continuous control operation changes into a discontinuous cut-off operation. At this instant, the amplifier 111, connected after proportional controller 110, is directly and fully actuated by control unit 112. Thereupon, electromagnetic brake 115 is energized to exert the maximum admissible torque in a discontinuous manner and stops the drive. By stopping the drive at a very low velocity, the scattering to be expected at this moment is reduced to such an extent that it does not exceed a displacement increment.

Figure 4:
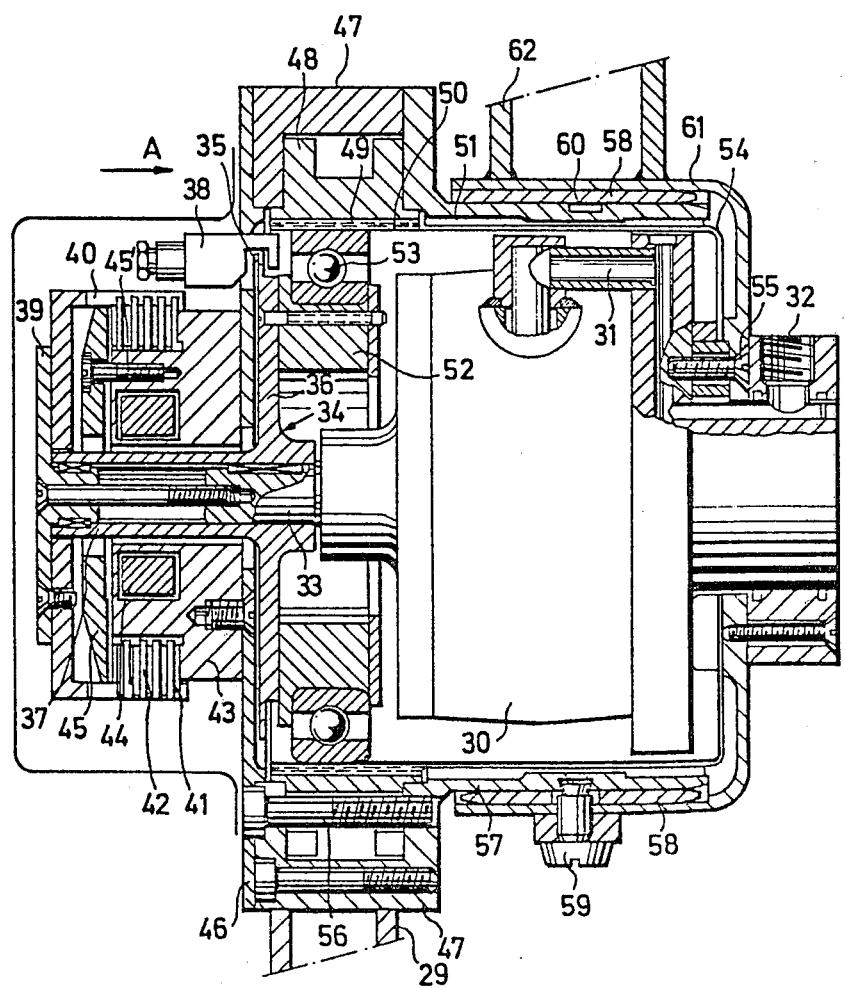
FIG. 4 is an axial sectional view of a rotary drive embodying the invention, and showing a vane-type air motor in elevation.
Figure 5:
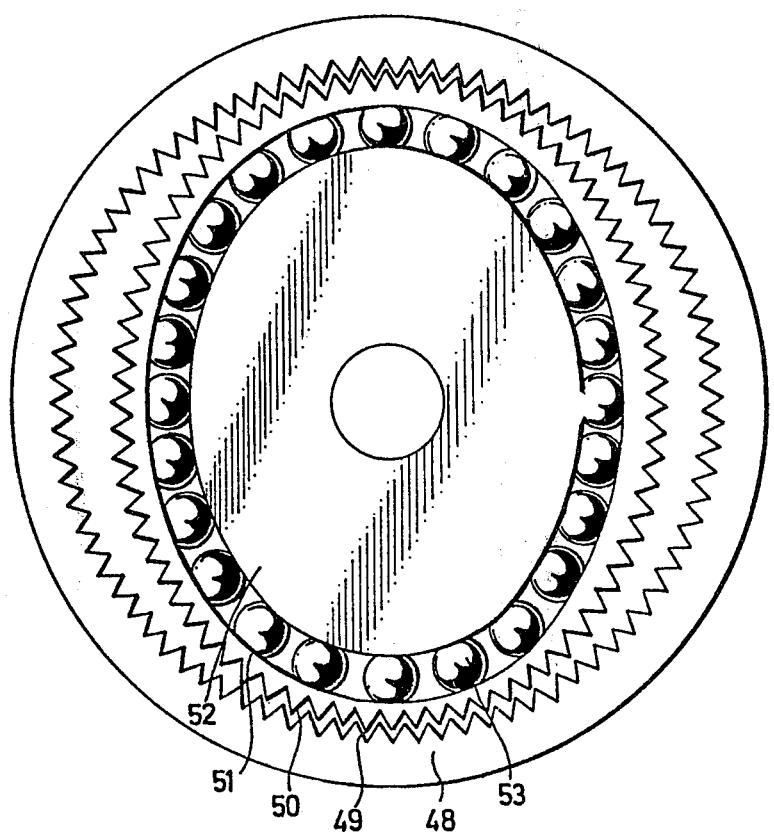
FIG. 5 is a front elevation view of a wobble gearing of the rotary drive illustrated in FIG. 4, and taken in the direction of the arrow A in FIG. 4.

FIG. 4 shows an embodiment of the invention for imparting a rotary motion to the working member.

The rotary drive comprises a vane-type air motor 30 whose housing only is shown in elevation in FIG. 4. However, the air inlet conduit 31 of the motor and its connection 32 may be seen in a cutaway view. The motor includes an eccentric rotor formed with radial slots in which the vanes are radially displaceable. The vanes rotate with the rotor and are pressed against the inner surface of housing or stator 30 by springs so that during rotation, they brush therealong. Such a rotaty motor or engine is well known and therefore not described in more detail. A rotary disc 34 is keyed to the output shaft 33 of the motor and formed with a flange portion 36 having a toothed periphery 35 and a tubular web portion 37. The toothed periphery of flange portion 36 is straddled by a pulse transmitter 38. Toothing 35 of flange portion 36 and pulse transmitter 38 together form an incremental displacement pick-up. The output signal of the pick-up is a measure for the angular displacement covered by a working member or the manipulator arm 29 and, in relation to time, for the velocity of displacement.

Tubular hub portion 37 carries the rotor 39 of an electromagnetic brake. Rotor 39 comprises a cap or bell 40 carrying axially extending arms which are circumferentially spaced at equal angular distances. On these arms, the axially outer braking discs 41 are guided. Between axially adjacent outer braking discs 41, inner braking discs 42 are provided.

Inner braking disks 42 are guided in axial recesses of the stator 43 of the electromagnetic brake. Upon excitation of winding 44, a pressure ring 45 which is connected to stator 43 so as to be axially displaceable on screws 45', is pulled against the braking discs 41, 42 thereby effecting a controlled or uncontrolled braking operation. By means of a flange 46, stator 43 of the brake is connected to the housing 47 of the drive enclosing vane-type air motor 30 as well as a wobble gearing and, in addition, supporting the pivotable arm 29 of the manipulator.

The wobble gearing surrounds housing 30 of the vane-type air motor, and comprises substantially three basic parts, namely a stationary steel ring 48 formed with a rigid toothed inner periphery 49, a deformable toothed rim, with teeth 50 on its outer periphery, formed on the free border of an elastic pot 51, and a wave generator in the form of an approximately elliptoidal cam 52 which is connected to the output shaft 33 of vane-type air motor 30 through the flange portion 36. Cam 52 is held against the free border of pot 51, comprising outer toothing 50, by means of an antifriction bearing 53. The bottom 54 of pot 51 is rigidly connected to the stator of vane motor 30 by screws 55.

The number of teeth of deformable toothed rim 50 is slightly smaller, in the limit case by a single tooth, than the number of teeth of rigid toothed rim 49. Consequently, at each turn of elliptoidal cam 52 rotating at the output speed of vane motor 30, a revolving motion of the engaging portion of deformable toothed rim 50 along rigid toothed rim 49 takes place. The thereby produced relative motion between two toothed rims 49 and 50 exactly corresponds to thr difference of their circumferential length.

The gearing may transmit its output power through pot 51 or through rigid ring 48. In the present example, pot 51 is fixed so that rigid ring 48, which is connected to housing 47 by screws 56, rotates at an output speed which is much lower than the input speed at which elliptoidal cam 52 is driven by motor 30. The speed ratio may be, for example, 200:1. This reduction results in a pivotal motion of manipulator arm 29 at a velocity corresponding to the output speed of the wobble gearing.

Housing 47 is supported, through an axial flange 57, in a bearing ring 58 which is axially held in its position relative to flange 57 by a screw 59 engaging into an annular groove 60 provided in flange 57. On its outside, bearing ring 58 is retained on the inner circumference of a pot-shaped stationary sleeve 61 which is secured to the stator of pneumatic vane motor 30 by means of screws 55 which also secure pot 51. Pot-shaped sleeve 61 is supported by a stationary arm 62.

The translatory drive according to FIG. 6 which, in principle, has already been described in connection with FIG. 1, comprises an air cylinder 70 connected to a tubular stationary housing part 71 by means of a threaded sleeve 72. The piston rod 73 of cylinder 70 is rigidly connected to an inner tube 74 projecting into stationary tubular part 71. Stationary part 71 is supported by a frame generally designated 75 which is also provided with guides 76 and 77 for inner tube 74. At its right-hand side as seen in FIG. 6, inner tube 74 carries a manipulator gripper generally designated 80. The under side of inner tube 74, as viewed in FIG. 6, is made in one piece with a toothed rack 81 and an axial slot 82 is provided in tubular part 71 for receiving the toothed rack during motion of piston rod 73 and, thereby, of inner tube 74. Toothed rack 81 meshes with a pinion 83 mounted coaxially of an electromagnetic brake generally designated 84. The right hand half of pinion 83 and brake 84 is shown in a cross-sectional view. Pinion 83 and the rotor 85 of the electromagnetic brake, as well as tacho-generator 86 for picking up the speed and converting it into a voltage, are mounted on a common shaft 87. Electromagnetic brake 84 is designed in the same manner as the electromagnetic brake described in connection with FIG. 4 so that it would be superfluous to repeat the description. The operation of the drive shown in FIG. 6 is analogous to that described in connection with FIG. 1.

While specific embodiments of the invention have been shown and described in detail to illustrate the application of the inventive principles, it will be understood that the invention may be embodied otherwise without departing from such principles.

What is claimed is:

1. A drive, particularly for an industrial manipulator, comprising, in combination:
    an air-operated actuator having a driving element adapted for direct connection to a movable working member of a driven mechanism to displace the member when the actuator is activated, the atuator being constantly supplied with air at full operating pressure during both movement and non-movement of said driving element, whereby the air at full operating pressure is constantly available as a power reserve even when said driving element is not moving;
    a control valve connected to said actuator for controlling the constantly supplied air, said control valve having an open position and a closed position, the constantly supplied air of the actuator taking place with the control valve in the open position;
    an electromagnetic brake means connected to said driving element having a movable brake element engageable with said driving element, and selectively operable, when energized, to brake said driving element;
    a control system connected to said actuator and to said brake means and controlling the position and velocity of said driving element and energization of said brake means;
    said control system including control means controlling the position of said control valve for constantly supplying air at full operating pressure to said actuator when it is activated to move said driving element at a controlled initially relatively high velocity toward a preselected final position;
    said control means, when said driving element attains a preselected position at a measurable distance in advance of the preselected final position, controllably energizing said brake means independently of the controlling of the position of said control valve, to decelerate said driving element to a velocity, at a position immediately in advance of the final position, which is a minor fraction of said initial velocity, while continuing supplying air at full operating pressure to said actuator, and then fully energizing said brake means to stop said driving element substantially at said final position with said actuator still supplied with air at full operating pressure to maintain said driving element stationary in said final position;
    said actuator, due to still being supplied with air at full operating pressure with said driving element stationary, absorbing any load reaction in excess of that absorbable by said electromagnetic brake means, whereby said drive, due to the inclusion of said air-operated actuator constantly supplied with air at full operating pressure has the load-displacing and load-sustaining advantages of a purely pneumatic drive and, due to the inclusion of said electromagnetic brake means, has a continuous velocity control and accurate position control advantages of a purely electrical drive;
    said control system including means deriving an error signal representing the difference between the actual position of said driving element and the desired final position thereof, said control means effecting quasi-continuous cut-off control of the energization of said electromagnetic brake to continuously control the velocity of said driving element as a function of the error signal until said driving element reaches said position immediately in advance of the final position at which its velocity has been reduced to a creep velocity which is a minor fraction of said initial velocity; said control means thereupon controlling said quasi-continuous cut-off control of the energization of said electromagnetic brake means for instantaneous full energization of said electromagnetic brake means to stop said driving element substantially at the final position;
    said control system including measuring means operatively associated with said driving element to determine the actual position of said driving element; setting means operable to set the desired position of said driving element; position comparing means connected to said measuring means and to said setting means and producing an output displacement error signal corresponding to the difference between the actual and desired position of said driving element, means operable to measure the velocity of said driving element and to produce an output signal corresponding to the velocity of said driving element; comparator means having inputs connected to said position comparing means and to said velocity measuring means and comparing the displacement error signal with the velocity signal; and a controller having an input connected to the output of said comparator means and producing an output signal controlling energization of the electromagnetic brake means.

2. A drive, as claimed in claim 1, in which said air-operated actuator is an air-operated piston-cylinder linear actuator having a piston rod adapted for connection to the movable working member, the piston of said actuator constituting said driving element.

3. A drive, as claimed in claim 1, in which said measuring means comprises an incremental displacement pickup producing an output signal from which both the actual position and the velocity values are derived.

4. A drive, as claimed in claim 3, in which said controller comprises a proportional controller.

5. A drive, as claimed in claim 4, in which said means measuring the velocity of said driving element comprises a frequency-voltage converter connected to the output of said incremental displacement pick-up.

6. A drive, as claimed in claim 4, wherein said controller is constituted by a module in said control system and is operable to control said electromagnetic brake means to provide, initially, for controlled displacement of said driving element toward the desired final position; said module, responsive to said driving element, attaining said creep velocity at said position immediately in advance of the final position, being operable to provide for full energization of said electromagnetic brake independently of said controller to stop said driving element substantially at said final position.

7. A drive, as claimed in claim 1, wherein said electromagnetic brake means is a multiple disc brake and said movable brake element is a brake rotor mounted on a shaft operatively connected to said driving element for rotation at a speed corresponding to the velocity of said driving element.

8. A drive, as claimed in claim 1, wherein said air-operated actuator is an air-operated piston-cylinder linear actuator including a cylinder, a piston reciprocable in said cylinder, and a piston rod connected to said piston; said electromagnetic brake means comprising a multiple disc-brake and said movable brake element comprising a brake rotor; and coupling means operatively connecting said brake rotor to said piston rod.

9. A drive, as claimed in claim 8, wherein said coupling means comprises a toothed rack connected to said piston rod; a pinion meshing with said rack; and a common shaft mounting said pinion and said brake rotor.

10. A device for controlling the operation of a pneumatic pressure operated piston member movable in a pneumatic pressure casing, comprising means for directing a compressible gas pressure into the pressure casing to move the piston member, a working member connected to the piston member and movable therewith, electromagnetic brake means engageable with said working member including a part movable with said working member and acting on said working member to override said gas pressure means as said gas pressure means continues to apply full gas pressure to said pressure casing to stop said working member and said piston member at an accurately controlled braked position, and control means connected to said gas pressure means and to said brake means for continually supplying gas to said pressure casing at full operating pressure to move said piston member at a controlled initially relatively high velocity toward a preselected final position and, when said piston member attains a preselected position at a measurable distance in advance of the preselected final position, controllably energizing said brake means to decelerate said piston member and working member to a velocity, at a location immediately in advance of the final position, which is a minor fraction of said initial velocity, and then fully energizing said brake means to stop said piston member and said working member substantially at said final position which comprises said braked position, said control means effecting quasi-continuous cut-off control of the energization of said electromagnetic brake means to continuously control the velocity of said working member as a function of an error signal representing the difference between the actual position of said working member and the desired final position thereof until said working member reaches said position immediately in advance of the final position at which its velocity has been reduced to a creep velocity which is a minor fraction of said initial velocity, said control means thereupon interrupting said quasi-continuous cut-off control of the energization of said electromagnetic brake means for instantaneous full energization of said electromagnetic brake means to stop said working element substantially at said final position, said control means including measuring means operatively associated with said working member to determine the actual position of said working member, setting means operable to set the desired position of said working member, position comparing means connected to said measuring means and to said setting means and producing an output displacement error signal corresponding to the difference between the control and desired positions of said working member, means operable to measure the velocity of said working member and to produce an output signal corresponding to the velocity of said working member, comparator means having inputs connected to said position comparing means and to said velocity measuring means and comparing the displacement error signal with the velocity signal, and a controller having an input connected to the output of said comparator meansand producing an output signal correcting energization of said electromagnetic brake means.

11. A device according to claim 10, wherein said measuring means comprises an incremental displacement pickup producing an output signal from which both the actual position and the velocity values are derived.

12. A device according to claim 11, wherein said controller comprises a proportional controller.

13. A device according to claim 12, wherein said means measuring the velocity of said working member comprises a frequency-voltage converter connected to the output of said incremental displacement pickup.

14. A device according to claim 12, wherein said controller comprises a module in said control means and is operable to control said electromagnetic brake means to provide, initially, for controlled displacement of said working member toward the desired final position, said module responsive to said working member attaining said creep velocity at said position immediately in advance of said final position and being operable to provide for full energization of said electromagnetic brake means independently of said controller to stop said working member substantially at said final position.

15. A device according to claim 10, wherein said gas pressure operated piston member movable in a gas pressure casing comprises an air operated piston—cylinder linear actuator having a piston rod adapted for connection to the movable working member, the piston of said actuator constituting said piston member.

16. A device according to claim 15, wherein said brake means comprises a multidisc brake and said movable brake means part comprises a brake rotor, said device further including coupling means operatively connecting said brake rotor to said piston rod, said coupling means comprising a toothed rack connected to said piston rod, a pinion meshed with said rack, and a common shaft mounting said pinion and said brake rotor.

17. A device according to claim 10, wherein said electromagnetic brake means is a multidisc brake and said brake means part movable with said working member comprises a brake rotor mounted on a shaft operatively connected to said working member for rotation at a speed corresponding to the velocity of said working member.

18. A device according to claim 10, wherein said gas pressure operated piston member movable in a fluid pressure casing comprises a vane-type air motor, said electromagnetic brake means comprising a multidisc brake and said movable working member comprises a brake rotor, a rotor of said vane-type motor having an output shaft, said brake rotor being mounted to said output shaft, said working member comprising a wobble gearing having a deformable gear component, said vane-type air motor being mounted within said deformable gear component of said wobble gearing.

19. A device according to claim 10, wherein said pressure operated piston member movable in a gas pressure casing comprises an air operated vane type motor having a rotor constituting said piston member.

* * * * *